(12) United States Patent
Cross

(10) Patent No.: US 7,393,270 B2
(45) Date of Patent: Jul. 1, 2008

(54) RECONFIGURABLE SHELLFISH OPENER

(76) Inventor: Christopher Todd Cross, 3303 W. Centennial, Littleton, CO (US) 80123

( * ) Notice: Subject to any disclaimer, the term of this patent is extended or adjusted under 35 U.S.C. 154(b) by 0 days.

(21) Appl. No.: 11/468,175

(22) Filed: Aug. 29, 2006

(65) Prior Publication Data

US 2007/0077877 A1 Apr. 5, 2007

Related U.S. Application Data

(60) Provisional application No. 60/712,069, filed on Aug. 29, 2006.

(51) Int. Cl.
*A22C 29/02* (2006.01)
(52) U.S. Cl. .......................................................... 452/6
(58) Field of Classification Search .................. 452/13, 452/16
See application file for complete search history.

(56) References Cited

U.S. PATENT DOCUMENTS

| 189,966 | A | * | 4/1877 | Temple | 452/16 |
| 332,403 | A | * | 12/1885 | Leduc | 452/16 |
| 845,521 | A | * | 2/1907 | Carson | 452/16 |
| 1,071,352 | A | * | 8/1913 | Schmidt | 452/16 |
| 2,520,790 | A | * | 8/1950 | Wesik | 452/16 |
| 4,348,788 | A | * | 9/1982 | Jurcak | 452/16 |
| 5,482,500 | A | * | 1/1996 | Boettner et al. | 452/16 |

* cited by examiner

*Primary Examiner*—Thomas Price
(74) *Attorney, Agent, or Firm*—Swanson & Bratschun, L.L.C.

(57) ABSTRACT

A device for opening shellfish which includes a base and a reconfigurable handle pivotably connected to the base. The device also includes multiple blades operatively associated with the reconfigurable handle such that each of the blades may be selectively positioned in an operative orientation to open shellfish.

11 Claims, 2 Drawing Sheets

RECONFIGURABLE SHELLFISH OPENER

RELATED APPLICATIONS

This application claims priority from U.S. Provisional Patent Application Ser. No. 60/712,069, filed Aug. 29, 2006, entitled "Reconfigurable Shellfish Opener," which is hereby incorporated by reference.

TECHNICAL FIELD

The present invention is directed toward a shellfish opener, and more particularly toward a shellfish opener which may be reconfigured to apply more than one type of opening tool to a shellfish.

BACKGROUND ART

Bivalve shellfish such as oysters or clams must be opened prior to preparation or consumption. The process of opening a shellfish is known as "shucking". Traditionally, oysters and clams are shucked with a knife or other tool having a sharp and curved blade. Often shellfish such as oysters are held in one hand while the shucking knife is manipulated with the other hand. Such use exposes the person opening an oyster or clam to serious potential injury if and when the shucking knife slips.

Various types and sizes of shellfish are opened in preparation for human consumption. Some of these shellfish, such as oysters, are quite large with very tough and rugged shells; other shellfish, such as certain types of clams, are smaller with thinner, more delicate shells. A shucking tool with a single type of blade is thus unlikely to be suitably sized and configured for opening various types of shellfish.

The present invention is directed toward overcoming one or more of the problems discussed above.

SUMMARY OF THE INVENTION

One aspect of the present invention is a device for opening shellfish which includes a base and a reconfigurable handle pivotably connected to the base. The device also includes multiple blades operatively associated with the reconfigurable handle such that any one of the blades may be selectively positioned in an operative orientation to open shellfish.

The device may also include a trough associated with the base configured to receive an unopened shellfish and hold the unopened shellfish with an appropriate orientation for engagement with one of the multiple blades.

The device may also include a pedestal attached to the base, with the pivotal connection between the reconfigurable handle and the base located on the pedestal opposite its attachment to the base. The pedestal may be sized so that shellfish of varying shapes and sizes will fit appropriately between the trough and the operative blade.

In one embodiment of the present invention, the pivotal connection includes a removable pin. Removal of the pin releases the reconfigurable handle from the pivotal connection, allowing the reconfigurable handle to be rotated 180° about its lengthwise axis. In this embodiment, two blades are attached to the reconfigurable handle on opposite sides of the handle, and rotating the handle 180° and reengaging it with the pivot will allow the user to select either the first or second blade for use.

DETAILED DESCRIPTION OF THE PREFERRED EMBODIMENT

Figure 1:
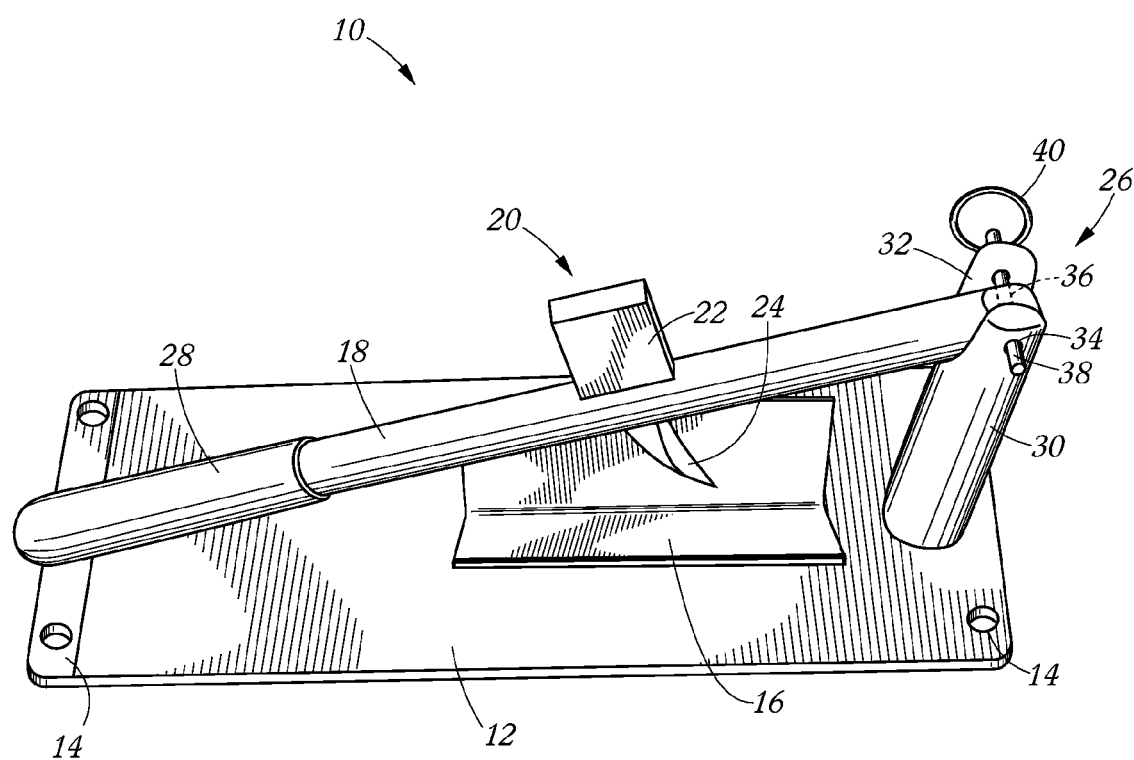
FIG. 1 is a perspective view of a reconfigurable shellfish opener consistent with the present invention.

An embodiment of the reconfigurable shellfish opener 10 is shown in FIG. 1. The reconfigurable shellfish opener 10 is also referred to as "the device" herein. The reconfigurable shellfish opener 10 is reconfigurable because apparatus is included which allows the presentation of any one of multiple blades or opening tools for engagement with a shellfish during use as is described more fully herein.

The reconfigurable shellfish opener 10 includes a base 12. The base 12 is a suitably sized, generally planar structure to which other components of the reconfigurable shellfish opener 10 are mounted. The base 12 of FIG. 1 is rectangular, although other base shapes may be selected for implementation of the present invention. The base 12 is perforated with one or more mounting holes 14 which provide for the stable mounting of the base 12 to a work surface. Alternatively, the base can be mounted or placed in a tray or dish (not shown in FIG. 1) which allows for the capture of juices from an open shellfish.

The reconfigurable shellfish opener 10 may also include a trough 16 which is shown in FIG. 1 as an angular bracket bonded to the base 12. Other configurations or shapes of a trough 16 are suitable for implementation of the present invention, with the sole functional requirements being that the trough 16 adequately supports and receives shellfish of variable sizes for opening in an operative position relative to a reconfigurable handle 18.

As is also shown in FIG. 1, the reconfigurable shellfish opener 10 includes the reconfigurable handle 18 which is pivotally connected to the base 12. The reconfigurable handle 18 is operatively associated with multiple blades 20 which can be applied to a shellfish for opening. The embodiment shown in FIG. 1 includes two blades 20, the first being a chisel blade 22 and the second being a curved, pointed blade 24. Alternative embodiments may include a greater number of blades 20 or other opening tools. As is shown in FIG. 1, a two bladed embodiment may feature blades 20 positioned on opposite sides of the reconfigurable handle 18. A first blade, for example a chisel blade 22, and a second blade, for example a curved, pointed blade 24, may be pointed such that the two blades define a vertical plane normal to the base 12. In this configuration, the position of the blades 20 may be switched by rotating the reconfigurable handle 18 180° about its lengthwise axis as is described in detail below. Thus, either of the two blades 20 may be placed in an operative orientation facing the trough 16.

The embodiment shown in FIG. 1 features two blades 20 as described above which are interchangeable by rotating the reconfigurable handle 18 about its lengthwise axis. In alternative embodiments, more than two blades 20 may be attached to the reconfigurable handle 18. For example, four blades 20 may be associated with the handle 18 and placed at 90° intervals around the reconfigurable handle 18. In such an embodiment, the operative blade 20 would be selected by rotating the reconfigurable handle 18 in 90° increments. Other suitable configurations will be readily apparent to those skilled in the art.

The reconfigurable handle 18 is pivotally connected to the base 12 by means of a pivot 26. By placing the pivot 26 at one end of the reconfigurable handle 18 opposite a grip 28, the reconfigurable handle 18 is configured as a lever which allows a user to apply a great deal of downward force to the operative blade 20 which is engaged with a shellfish placed in the trough 16.

Certain advantages are realized if the pivotal connection 26 is placed at one end of a pedestal 30, which pedestal 30 is attached to the base 12 at its opposite end. The use of a pedestal 30 of an appropriate length allows both large and small shellfish to be appropriately positioned between the blade 20 and the trough 16. Furthermore, the use of a pedestal 30 of appropriate length assures that the force a user applies to an operative blade 20 engaged with a shellfish is applied along a line as near to perpendicular to the base 12 as is possible for an average sized shellfish. It is desirable to apply force with a range that is close to perpendicular to the base 12 so that there is no tendency for the shellfish to slip out of the trough 16.

The pivotal connection 26 of FIG. 1 includes a notch 32 molded, carved, cast, machined, or otherwise formed in the end of the pedestal 30 opposite the base 12. A bore 34 may be formed in the material of the pedestal 30 on each side of the notch 32. A corresponding bore 36 may be formed in the end of the reconfigurable handle 18 which will be received in the notch 32. A removable pin 38 having a ring 40 or other gripping structure at one end may be placed through the bore 34 in the pedestal 30 and through the bore 36 in the handle 18, thus connecting these elements in a pivotal manner. The pin 38 may include a spring-based detent or other structure to resist inadvertent removal of the pin 38.

The pivotal connection 26 described above provides for easy handle 18 reconfigurations since the pin 38 is easily removable by pulling on the ring 40 and removing the pin 38 from bores 34, 36. When the pivotal connection 26 is disengaged in such a fashion, the reconfigurable handle 18 may be rotated 180° and the pivotal connection 26 reassembled, thus bringing a different blade 20 into the operative position. In an embodiment featuring more than two blades 20, for example a four-bladed embodiment, a similar pivotal connection 26 may be used. In a four-bladed embodiment, rotation of the reconfigurable handle 18 along its lengthwise axis in 90° increments will be necessary to select the appropriate blade 20. It would also be necessary to include multiple bores 34, 36 through the reconfigurable handle 18 to provide for the reconnection of the pivotal connection 26 at 90° increments.

Alternatively, a rotating junction or connection (not shown in FIG. 1) may be included on the reconfigurable handle 18 between the pivotal connection 26 and the blades 20. The rotating connection or junction can be of any type known in the connecting arts which will allow the grip 28 end of the reconfigurable handle 18 and attach blades 20 to rotate in user selected increments separate from the pivotal connection 26.

Figure 2:
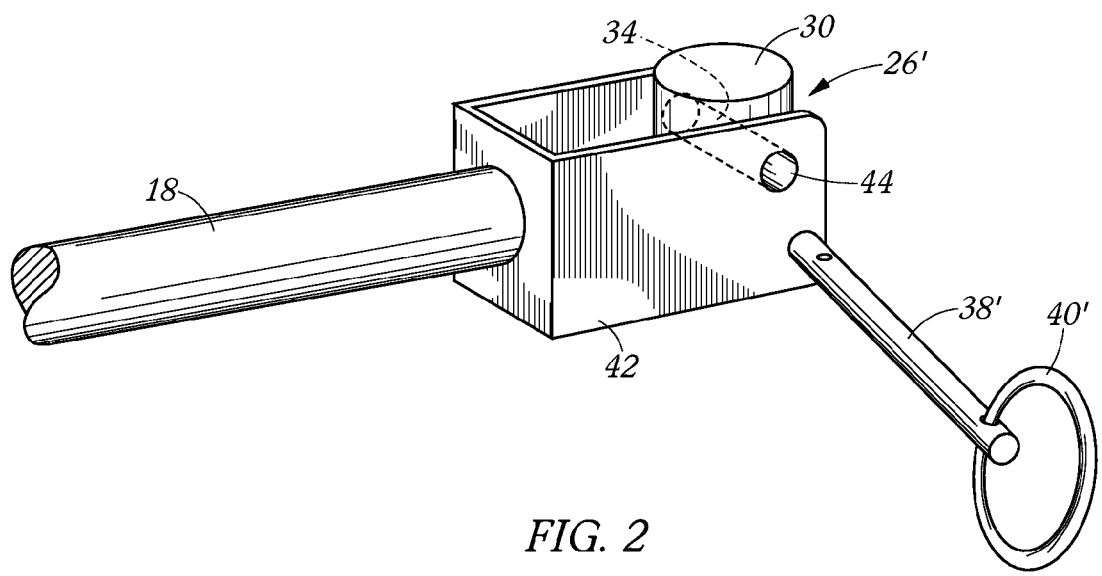
FIG. 2 is a perspective view of an alternative pivotal connection consistent with the present invention.

Other types of pivotal connection are within the scope of this invention. For example, as is shown in FIG. 2, the end of the reconfigurable handle 18 opposite the grip 28 may be attached to a bracket 42 which is sized to fit around the end of the pedestal 30 opposite the base 12. The bracket 42 may be perforated with one or more holes 44 which can receive a pin 38' which may be terminated with a ring 40'. In this alternative embodiment, the pedestal 30 will not be formed into a notch 32, however, a bore 34 will be formed through the unnotched pedestal 30.

Figure 3:
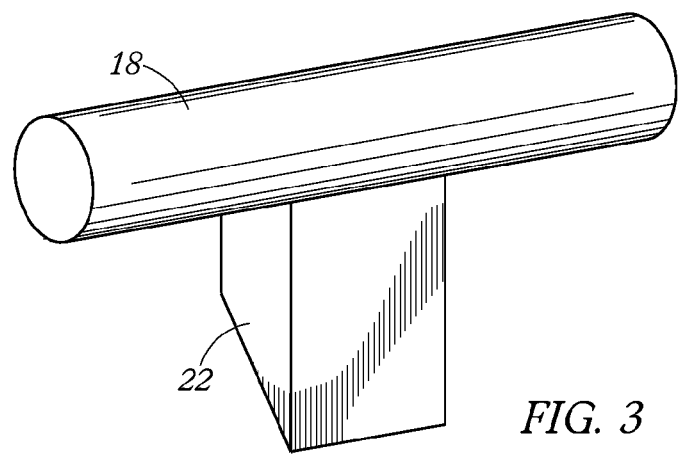
FIG. 3 is a perspective view of a chisel blade suitable for implementation with the present invention.
Figure 4:
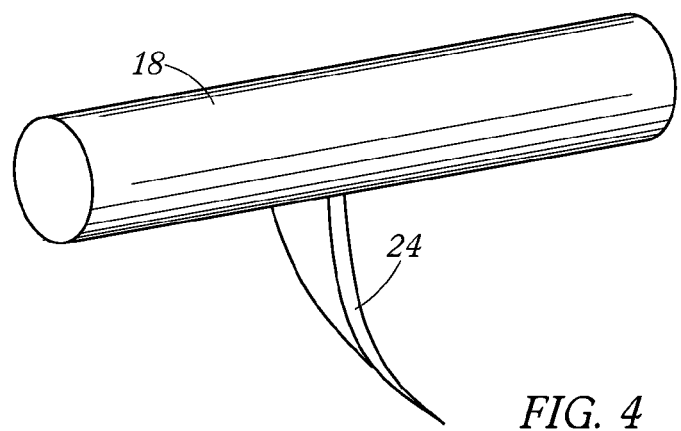
FIG. 4 is a perspective view of a curved, pointed blade suitable for implementation with the present invention.

The reconfigurable handle 18 will be associated with more than one type of blade 20, as is discussed above. Any type, configuration, shape, or size of blade or tool which is deemed suitable for opening a shellfish may be attached to or associated with the reconfigurable handle 18. Two blades 20 which have proven to be useful for opening shellfish are a chisel blade 22, which is shown in detail in FIG. 3, and a pointed, curved blade 24, which is shown in detail in FIG. 4. These blade styles are shown by way of illustration, and are not intended to be limiting of the scope of this invention in any way.

In use, the operator of the reconfigurable shellfish opener 10 selects a shellfish for opening and places it in the trough 16 with the seam between the two shells of a typical bivalve facing upward. In order to place the shellfish into the trough 16, the operator will have lifted the reconfigurable handle 18 upward to provide clearance between the operative blade 20 and the shellfish in the trough 16. To open the shellfish, the operator applies downward force to the grip 28 of the reconfigurable handle 18, forcing the selected blade 20 between the shells and into the shellfish, prying the shellfish open. The operator may remove the pin 38 from the pivot 26 by pulling on the ring 40 and rotate the handle 18 180° or another suitable increment before replacing the pin 38 if a different blade 20 style is desired. Other types of reconfiguration mechanisms such as a rotatable connection on the handle 18 would also be suitable for implementation of the present invention.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A device for opening shellfish comprising:
   a base;
   a reconfigurable handle pivotally connected to the base; and
   multiple blades attached to and extending transverse in radially offset directions from a longitudinal axis of the reconfigurable handle such that each of the blades may be selectively positioned in an operative orientation relative to the base by rotation of the handle about the longitudinal axis.

2. The device for opening shellfish of claim 1 further comprising a trough associated with the base configured to receive an unopened shellfish in operative association with a select blade.

3. The device for opening shellfish of claim 1 further comprising a pedestal having a proximal end attached to the base and an opposing distal end.

4. The device for opening shellfish of claim 3 wherein the pivotal connection between the reconfigurable handle and the base is located on the pedestal near the distal end.

5. The device for opening shellfish of claim 4 wherein the pivotal connection comprises a removable pin.

6. The device of claim 5 wherein the removable pin is received through a bore in the reconfigurable handle and reconfiguration of the handle comprises removing the removable pin, rotating the reconfigurable handle 180 degrees about its lengthwise axis and replacing the pin.

7. The device of claim 6 wherein two blades are attached to the reconfigurable handle with a first of the two blades being oriented substantially upward and a second of the two blades is oriented substantially downward such that the two blades define a vertical plane normal to the base and the position of the blades may be switched by rotating the reconfigurable handle 180 degrees about its lengthwise axis.

8. The device for opening shellfish of claim 1 wherein the multiple blades comprise a first chisel blade and a second curved, pointed blade.

9. The device for opening a shellfish of claim 8 wherein first and second blades are attached on opposite axial sides of the reconfigurable handle.

10. A method of opening shellfish comprising:
providing an elongate handle extending along a lengthwise axis, the handle having at least first and second blades extending radially therefrom, the handle further having a pivotal connection to a base;
axially rotating the elongate handle to align a select blade extending substantially normally toward the base;
pivoting the handle away from the base;
positioning a shellfish on the base in an operative position relative to the select blade with a seam of the shellfish substantially parallel to the lengthwise axis; and
pivoting the handle toward the base to engage the select blade with the seam of the shellfish.

11. The method of claim 10 further comprising providing a trough attached to the base extending along the lengthwise axis and positioning the shellfish on the base within the trough.

* * * * *